US012564883B2

(12) United States Patent
Stewart et al.

(10) Patent No.: US 12,564,883 B2
(45) Date of Patent: Mar. 3, 2026

(54) METHOD OF ADDITIVE MANUFACTURING

(71) Applicant: BAE Systems plc, London (GB)

(72) Inventors: Peter Neil Stewart, Balderstone (GB); Howard James Price, Balderstone (GB)

(73) Assignee: BAE Systems plc, London (GB)

( * ) Notice: Subject to any disclaimer, the term of this patent is extended or adjusted under 35 U.S.C. 154(b) by 367 days.

(21) Appl. No.: 18/261,533

(22) PCT Filed: Jan. 7, 2022

(86) PCT No.: PCT/GB2022/050022
§ 371 (c)(1),
(2) Date: Jul. 14, 2023

(87) PCT Pub. No.: WO2022/153034
PCT Pub. Date: Jul. 21, 2022

(65) Prior Publication Data
US 2024/0075528 A1 Mar. 7, 2024

(30) Foreign Application Priority Data

Jan. 18, 2021 (EP) ..................................... 21275007
Jan. 18, 2021 (GB) ..................................... 2100629

(51) Int. Cl.
*B22F 10/32* (2021.01)
*B22F 12/70* (2021.01)
(Continued)

(52) U.S. Cl.
CPC .............. *B22F 10/32* (2021.01); *B22F 12/70* (2021.01); *B22F 2201/03* (2013.01);
(Continued)

(58) Field of Classification Search
CPC ...... B22F 10/32; B22F 12/70; B22F 2201/03; B22F 2999/00; B33Y 10/00; B33Y 70/00
See application file for complete search history.

(56) References Cited

U.S. PATENT DOCUMENTS 8,609,190 B2 * 12/2013 Ogris ...................... H01J 7/186
427/591
2007/0205720 A1 9/2007 Sparks
(Continued)

FOREIGN PATENT DOCUMENTS

EP 3209446 A1 8/2017
JP 2019510882 A 4/2019
(Continued)

OTHER PUBLICATIONS

GB Search Report for Application No. 21275007.9 mail date Mar. 3, 2021, 3 pages.
(Continued)

*Primary Examiner* — Ricardo D Morales
(74) *Attorney, Agent, or Firm* — Maine Cernota & Curran

(57) ABSTRACT

A method of additive manufacturing an article from a feed material in a chamber includes evacuating at least some of a first gas from the chamber, thereby reducing a pressure therein from a first pressure to a second pressure and reducing the first gas from a first concentration to a second concentration. At least some of the first gas is then gettered from the chamber using a getter, thereby lowering the first gas concentration to a third concentration. The article is then additive manufactured from the feed material in the chamber using the getter as a substrate. The gettering comprises heating the getter at least in part using a fusion source, and the additive manufacturing comprises heating the feed material at least in part using the fusion source.

9 Claims, 4 Drawing Sheets

(51) Int. Cl.
   *B33Y 10/00*          (2015.01)
   *B33Y 70/00*          (2020.01)
(52) U.S. Cl.
   CPC ........... *B22F 2999/00* (2013.01); *B33Y 10/00*
                   (2014.12); *B33Y 70/00* (2014.12)

(56)                   References Cited

U.S. PATENT DOCUMENTS

| | | | |
|---|---|---|---|
| 2017/0252851 A1 | 9/2017 | Fulop | |
| 2017/0304945 A1 | 10/2017 | Sutcliffe | |
| 2018/0304540 A1* | 10/2018 | Tobia .................... | B22F 10/31 |
| 2018/0318932 A1 | 11/2018 | Myerberg | |

FOREIGN PATENT DOCUMENTS

| | | | |
|---|---|---|---|
| JP | 2019518864 A | 7/2019 | |
| JP | 2019522105 A | 8/2019 | |
| JP | 2019522720 A | 8/2019 | |
| WO | 2016062714 A1 | 4/2016 | |
| WO | 2019203275 A1 | 10/2019 | |
| WO | 2019244415 A1 | 12/2019 | |

OTHER PUBLICATIONS

EP Search Report for Application No. 21275007.9 mail date Jul. 15, 2021, 8 pages.
International Search Report and Written Opinion for PCT application No. GB2022/050022 mail date Apr. 21, 2022, 11 pages.
International Preliminary Report on Patentability for PCT application No. GB2022/050022 mail date Jul. 27, 2023, 8 pages.

\* cited by examiner

METHOD OF ADDITIVE MANUFACTURING

RELATED APPLICATIONS

This application is a national phase application filed under 35 USC § 371 of PCT Application No. PCT/GB2022/050022 with an International filing date of Jan. 7, 2022, which claims priority of GB Patent Application 2100629.1 filed Jan. 18, 2021 and EP Patent Application 21275007.9 filed Jan. 18, 2021. Each of these applications is incorporated herein by reference in their entirety for all purposes.

FIELD OF THE INVENTION

The present invention relates to additive manufacturing, for example powder bed fusion.

BACKGROUND TO THE INVENTION

Additive manufacturing (AM), also known as three-dimensional (3D) printing, generally refers to processes used to create articles or objects from layers of material sequentially formed under computer control. Additive manufacturing provides creation of articles having complex shapes, geometries or structures, including internal voids, that may not readily be formed according to conventional subtractive manufacturing processes, such as machining, or conventional casting or moulding processes. Materials suitable for additive manufacturing include metals, ceramics, glasses and polymers.

ISO/ASTM52900-15 defines seven categories of additive manufacturing processes, including powder bed fusion (PBF). Particularly, PBF techniques, such as direct metal laser sintering (DLMS), selective heat sintering (SHS), selective laser sintering (SLS), selective laser melting (SLM), laser metal deposition (LMD) and electron beam melting (EBM), are suitable for creation of metal articles, from feed materials such as metal powders and/or filaments. Similarly, polymeric articles may be manufactured from feed materials such as powders and/or filaments comprising polymeric compositions, including thermoplastics. The feed materials are heated to elevated temperatures, for example at a temperature T in a range of about $$\frac{2}{3}T_m \le T \le T_m,$$

where $T_m$ is the melting temperature of the feed material. At such temperatures, the feed material may react with reactive gases, such as $O_2$, forming products such as oxides. In addition or alternatively, residual gases may be incorporated into the articles as impurities. These impurities may be deleterious to the properties (e.g. mechanical properties) of the articles when included therein. Hence, powder bed fusion is typically conducted in a protective atmosphere, for example in an inert atmosphere such as an Ar and/or a $N_2$ atmosphere, and also in an enclosed chamber having such an atmosphere. However, residual and/or reactive gases may remain and/or be present in the protective atmosphere, for example at 10s ppm to 100s ppm levels, and are thus still deleterious to the properties of the articles thus formed. Furthermore, unused feed material, such as unsintered or unfused feed material (for example which is next to the used feed material), is also heated to relatively elevated temperatures, at which the feed material may still react with and/or incorporate such gases. Thus, reuse or recycling of unused feed material may be precluded due to contamination and/or effects due to thermal cycling in these PBF techniques, while disposal of such waste feed materials may be environmentally hazardous.

Hence, there is a need to improve additive manufacturing, for example powder bed fusion.

SUMMARY OF THE INVENTION

It is one aim of the present invention, amongst others, to provide a method of additive manufacturing which at least partially obviates or mitigates at least some of the disadvantages of the prior art, whether identified herein or elsewhere. For instance, it is an aim of embodiments of the invention to provide a method of additive manufacturing that reduces levels of residual and/or reactive gases, thereby lessening deleterious effects arising therefrom on articles formed by additive manufactured and/or on unused feed material.

A first aspect provides a method of additive manufacturing of an article from a feed material in a chamber, the method comprising:

evacuating at least some of a first gas of a set of gases from the chamber, comprising reducing a pressure therein from a first pressure to a second pressure of a set of pressures, wherein the first gas has a first concentration and a second concentration of a set of concentrations at the first pressure and the second pressure respectively, gettering at least some of the first gas from the evacuated chamber using a getter located in the evacuated chamber, thereby lowering a concentration of the first gas from the second concentration to a third concentration of the set of concentrations; and additive manufacturing the article from the feed material in the gettered chamber.

The gettering at least some of the first gas from the evacuated chamber comprises heating, at least in part, the getter using a fusion source, the additive manufacturing the article from the feed material in the gettered chamber comprises heating, at least in part, the feed material using the fusion source; and the getter is a substrate for additive manufacturing the article thereon.

A second aspect provides a method of additive manufacturing, for example by and/or comprising powder bed fusion, of an article from a feed material, for example comprising a powder and/or a filament, in a chamber, the method comprising:

evacuating at least some of a first gas of a set of gases from the chamber, comprising reducing a pressure therein from a first pressure to a second pressure of a set of pressures, wherein the first gas has a first concentration and a second concentration of a set of concentrations at the first pressure and the second pressure respectively;

gettering at least some of the first gas from the evacuated chamber using a getter, thereby lowering a concentration of the first gas from the second concentration to a third concentration of the set of concentrations; and additive manufacturing the article from the feed material in the gettered chamber.

A third aspect provides an apparatus for additive manufacturing, for example by and/or comprising powder bed fusion, of an article from a feed material, for example comprising a powder and/or a filament, comprising:

a chamber for additive manufacturing the article therein;

a pump for evacuating at least some of a first gas of a set of gases from the chamber, comprising reducing a pressure therein from a first pressure to a second pressure of a set of pressures, wherein the first gas has a first concentration and a second concentration of a set of concentrations at the first pressure and the second pressure respectively;

a getter for gettering at least some of the first gas from the chamber, thereby lowering a concentration of the first gas from the second concentration to a third concentration of the set of concentrations, optionally wherein the getter comprises and/or is a substrate, for example a base plate, for additive manufacturing the article thereon; and optionally, a fusion source, for example a laser beam and/or an electron beam, for heating, at least in part, the getter and/or the feed material.

DETAILED DESCRIPTION OF THE INVENTION

According to the present invention there is provided a method of, and an apparatus for, additive manufacturing, as set forth in the appended claims. Other features of the invention will be apparent from the dependent claims, and the description that follows.

Method

The present invention provides a method of additive manufacturing, for example by and/or comprising powder bed fusion, of an article from a feed material, for example comprising a powder and/or a filament, in a chamber, the method comprising:

evacuating at least some of a first gas of a set of gases from the chamber, comprising reducing a pressure therein from a first pressure to a second pressure of a set of pressures, wherein the first gas has a first concentration and a second concentration of a set of concentrations at the first pressure and the second pressure respectively;

gettering at least some of the first gas from the evacuated chamber using a getter, thereby lowering a concentration of the first gas from the second concentration to a third concentration of the set of concentrations; and additive manufacturing the article from the feed material in the gettered chamber.

In this way, the concentration of the first gas is lowered by gettering, thereby attenuating deleterious effects due to otherwise higher levels of the first gas during the additive manufacturing. That is, the levels of residual gases remaining and/or present in the chamber may be lowered from, for example at 10s ppm to 100s ppm levels, to, for example sub or low ppm levels. In this way, properties, for example mechanical properties, of the articles thus formed are improved compared with conventional additive manufacturing, thereby tending towards properties of the feed material. Furthermore, unused feed material, such as unsintered or unfused feed material, may be reused or recycled, because reaction thereof with the first gas may be lessened, thereby diminishing contamination thereof.

Particularly, the method according to the present invention is particularly beneficial for additive manufacturing of Ti alloy articles from Ti alloy powders by laser powder and fusion, in which oxygen and optionally nitrogen, for example, may be gettered to at most 1 ppm levels, thereby reducing levels of these impurities in the manufactured articles. Furthermore, unused Ti alloy powders maybe reused or recycled, since levels of these impurities in the unused to take alloy powders is not significantly increased.

Method

The method is of additive manufacturing, for example by and/or comprising powder bed fusion, of the article from the feed material, for example comprising a powder and/or a filament, in the chamber.

In one example, the additive manufacturing comprises and/or is L-PBF, for example SLM or LMD. One example, the additive manufacturing comprises and/or is EBM.

In one example, the method conforms with or exceeds ISO/ASTM52911-1-19 Additive manufacturing—Design—Part 1: Laser-based powder bed fusion of metals, mutatis mutandis. In one example, the method conforms with or exceeds ASTM F2924-14 Standard Specification for Additive Manufacturing Ti-6 Aluminum-4 Vanadium with Powder Bed Fusion, mutatis mutandis. In one example, the method conforms with or exceeds ASTM F3055-14a Standard Specification for Additive Manufacturing Ni Alloy (UNS N07718) with Powder Bed Fusion, mutatis mutandis. In one example, the method conforms with or exceeds ASTM F3184-16 Standard Specification for Additive Manufacturing Stainless Steel Alloy (UNS S31603) with Powder Bed Fusion, mutatis mutandis. In one example, the method conforms with or exceeds ASTM F3091/F3091M-14 Standard Specification for Powder Bed Fusion of Plastic Materials, mutatis mutandis. In one example, the method conforms with or exceeds proposed new ASTM standard, WK46188, Practice for Metal Powder Bed Fusion to Meet Rigid Quality Requirements, mutatis mutandis.

Feed Material

The method is of additive manufacturing of the article from the feed material, for example comprising a powder and/or a filament.

It should be understood that the powder comprises particles that are solid and may include discrete and/or agglomerated particles. In one example, the particles have an irregular shape, such as a spheroidal, a flake or a granular shape.

Generally, the powder may comprise any material amenable to fusion by melting, such as metals or polymeric compositions. The powder may comprise a metal, such as Al, Ti, Cr, Fe, Co, Ni, Cu, W, Ag, Au, Pt and/or an alloy thereof. Generally, the powder may comprise any metal from which particles may be produced by atomisation. These particles may be produced by atomisation, such as gas atomisation, close-coupled gas atomisation, plasma atomisation or water atomisation, or other processes known in the art. These particles may have regular, such as spherical, shapes and/or irregular, such as spheroidal, flake or granular, shapes.

These particles may have a size of at most 200 µm, at most 150 µm, at most 100 µm, at most 75 µm, at most 50 µm, at most 25 µm, at most 15 µm, at most 10 µm, at most 5 µm, or at most 1 µm. These particles may have a size of at least 150 µm, at least 100 µm, at least 75 µm, at least 50 µm, at least 25 µm, at least 15 µm, at least 10 µm, at least 5 µm, or at least 1 µm. Preferably, these particles have a size in a range 10 µm to 200 µm. More preferably, these particles have a size in a range 60 µm to 150 µm. In one example, the powder comprises particles having a size in a range from 5 µm to 200 µm, preferably from 10 µm to 150 µm. For L-PBF of Ti alloys for example, the powder preferably comprises particles having a size in a range from 15 µm to 45 µm and/or in a range from 20 µm to 63 µm, while for EBM of Ti alloys, the powder preferably comprises particles having a size in a range from 45 μm to 105 μm. For L-PBF of Ni, Al alloys and stainless steels for example, the powder preferably comprises particles having a size in a range from 15 μm to 53 μm, while for EBM of Ni, Al alloys and stainless steels, the powder preferably comprises particles having a size in a range from 50 μm to 150 μm.

For regular shapes, the size may refer to the diameter of a sphere or a rod, for example, or to the side of a cuboid. The size may also refer to the length of the rod. For irregular shapes, the size may refer to a largest dimension, for example, of the particles. The particle size distribution may be measured by use of light scattering measurement of the particles in an apparatus such as a Malvern Mastersizer 3000, arranged to measure particle sizes from 10 nm to 3500 micrometres, with the particles wet-dispersed in a suitable carrier liquid (along with a suitable dispersant compatible with the particle surface chemistry and the chemical nature of the liquid) in accordance with the equipment manufacturer's instructions and assuming that the particles are of uniform density. The particle size distribution may be measured according to ASTM B822-17 Standard Test Method for Particle Size Distribution of Metal Powders and Related Compounds by Light Scattering.

In one example, the particles have a relatively small particle size D, for example, at most 50 μm, preferably at most 20 μm. In one example, the particles have a relatively wide particle size D distribution, including a non-unimodal (e.g. bimodal) particle/or a non-monodisperse (i.e. not singular particle size) size distribution and, for example wherein D90/D10 is at least 3, preferably at least 5, more preferably at least 10). In one example, the particles have a relatively high bulk density, for example, at least 2,000 $kgm^{-3}$, preferably at least 2,500 $kgm^{-3}$, more preferably at least 2700 $kgm^{-3}$. In one example, the particles have a relatively low angle of repose, for example, at most 40°, more preferably at most 30°. In one example, the particles have a relatively low powder anisotropy so that stresses in the powder are equal in all directions and/or relatively low friction.

In one example, the powder comprises an additive, an alloying addition, a flux, a binder and/or a coating. In one example, the powder comprises particles having different compositions, for example a mixture of particles having different compositions.

It should be understood that unalloyed metals refer to metals having relatively high purities, for example at least 95 wt. %, at least 97 wt. %, at least 99 wt. %, at least 99.5 wt. %, at least 99.9 wt. %, at least 99.95 wt. %, at least 99.99 wt. %, at least 99.995 wt. % or at least 99.999 wt. % purity.

In one example, the powder comprises a metal. In one example, the metal is a transition metal, for example a first row, a second row or a third row transition metal. In one example, the metal is Sc, Ti, V, Cr, Mn, Fe, Co, Ni, Cu or Zn. In one example, the metal is Y, Zr, Nb, Mo, Tc, Ru, Rh, Pd, Ag or Cd. In one example, the metal is Hf, Ta, W, Re, Os, Ir, Pt, Au or Hg.

In one example, the first metal comprises a ferrous alloy or a nonferrous alloy, for example a stainless steel, an Al alloy, a copper alloy, a Ti alloy, a Ni alloy or mixtures of respective alloys thereof, preferably corresponding and/or compatible alloys (for example having similar or the same nominal compositions) thereof.

In one example, the feed material comprises a first row transition metal for example Sc, Ti, Cr, Mn, Ni or Cu, a second row transition metal for example Zr or Nb, a group III element for example Al, and/or a mixture thereof, for example an alloy.

In one preferred example, the feed material comprises and/or consists of a Ti alloy powder, for example a Ti-6Al-4V alloy, as described below, according to AMS 4911R, AMS 4928W, AMS 4965K and AMS 4905F.

Ti Alloy

In one example, the feed material comprises and/or is a Ti alloy powder, for example an α+β Ti alloy, or an α+β Ti alloy heat treated above a beta transus temperature $\beta_{transus}$ of the α+β Ti alloy.

α+β Ti Alloys

Elements having an atomic radius within ±15% of the atomic radius of Ti are substitutional elements and have significant solubility in Ti. Elements having an atomic radius less than 59% of the atomic radius of Ti, for example H, N, O and C, occupy interstitial sites and also have substantial solubility. The relatively high solubilities of substitutional and interstitial elements in Ti makes it difficult to design precipitation-hardened Ti alloys. However, B has a similar but larger radius than C, O, N and H and it is therefore possible to induce Ti boride precipitation. Cu precipitation is also possible in some alloys.

The substitutional elements may be categorised according to their effects on the stabilities of the α and β phases. Hence, Al, O, N and Ga are α stabilisers while Mo, V, W and Ta are all β stabilisers. Cu, Mn, Fe, Ni, Co and H are also β stabilisers but form the eutectoid. The eutectoid reaction is frequently sluggish (since substitutional atoms involved) and is suppressed. Mo and V have the largest influence on β stability and are common alloying elements. W is rarely added due to its high density. Cu forms $TiCu_2$, which makes such Ti alloys age-hardening and heat treatable. Zr, Sn and Si are neutral elements.

The interstitial elements do not fit properly in the Ti lattices and cause changes in the lattice parameters. Hydrogen is the most important interstitial element. Body-centred cubic (BCC) Ti has three octahedral interstices per atom while closed-packed hexagonal (CPH) Ti has one octahedral interstice per atom. The latter are therefore larger, so that the solubility of O, N, and C is much higher in the α phase.

Most α+β Ti alloys (also known as α-β Ti alloys, alpha-beta Ti alloys, dual-phase Ti alloys or two-phase Ti alloys) have high-strength and formability, and contain 4-6 wt. % of β stabilisers which allow substantial amounts of β to be retained on quenching from the β→α+β phase fields. A typical α+β Ti alloy is Ti-6Al-4V (all nominal compositions in wt. % unless noted otherwise), while other α+β Ti alloys include Ti-6Al-6V-2Sn and Ti-6Al-2Sn-4Zr-Mo. Al reduces alloy density, stabilises and strengthens the α phase and increases the α+β→β transformation temperature while V provides a greater amount of the more ductile β phase for hot-working and reduces the α+β→β transformation temperature. Table 1 shows nominal compositions of selected α+β Ti alloys.

TABLE 1

Nominal compositions of selected α + β Ti alloys.

| α + β Ti alloys designation | Tensile strength (MPa min) | 0.2% yield strength (MPa, min) | Composition (wt. %) | | | | | | | | | Impurity limits (wt. %, max) | | | | |
|---|---|---|---|---|---|---|---|---|---|---|---|---|---|---|---|---|
| | | | Al | Sn | Zr | Mo | V | Cu | Mn | Cr | Si | N | C | H | Fe | O |
| Ti—6Al—4V (g) (i) AMS 4911R | 900 | 830 | 5.5-6.75 | | | | 3.5-4.5 | | | | | 0.05 | 0.08 | 0.015 | 0.30 | 0.20 |
| Ti—6Al—4V (a) (g) (i) AMS 4928W | 900 | 830 | 5.5-6.75 | | | | 3.5-4.5 | | | | | 0.05 | 0.08 | 0.0125 | 0.30 | 0.20 |
| Ti—6Al—4V ELI (g) (h) AMS 4930K | 830 | 760 | 5.5-6.5 | | | | 3.5-4.5 | | | | | 0.05 | 0.08 | 0.0125 | 0.25 | 0.13 |
| Ti—6Al—4V (g) (i) AMS 4965K | 890 | 820 | 5.5-6.75 | | | | 3.5-4.5 | | | | | 0.05 | 0.08 | 0.0125 | 0.30 | 0.20 |
| Ti—6Al—4V (a) (g) (i) AMS 4967M | 890 | 820 | 5.5-6.75 | | | | 3.5-4.5 | | | | | 0.05 | 0.08 | 0.0125 | 0.30 | 0.20 |
| Ti—6Al—4V ELI (g) (h) (j) AMS 6932C | 860 | 790 | 5.5-6.5 | | | | 3.5-4.5 | | | | | 0.05 | 0.08 | 0.0125 | 0.25 | 0.13 |
| Ti—6Al—4V (g) (h) (i) AMS 4905F | 860 | 790 | 5.6-6.3 | | | | 3.6-4.4 | | | | | 0.03 | 0.05 | 0.0125 | 0.25 | 0.12 |
| Ti—6Al—6V—2Sn (a) (g) (i) AMS 4971L | 1030 | 970 | 5.0-6.0 | 1.5-2.5 | | | 5.0-6.0 | 0.35-1.0 | | | | 0.04 | 0.05 | 0.015 | | 0.2 |
| Ti—6Al—4V (g) (h) TIMETAL 6-4 ASTM Grade 5 Mil T-9047 | 970 | 920 | 5.5-6.75 | | | | 3.5-4.5 | | | | | 0.05 | 0.08 | 0.015 | 0.40 | 0.2 |
| Ti—6Al—4V (g) (h) TIMETAL 6-4 ELI ASTM Grade 23 AMS 4981 | 970 | 920 | 5.5-6.5 | | | | 3.5-4.5 | | | | | 0.03 | 0.08 | 0.0125 | 0.25 | 0.13 |
| Ti—6Al—4V—0.1Ru (g) (h) (k) ASTM Grade 29 | 970 | 920 | 5.5-6.5 | | | | 3.5-4.5 | | | | | 0.03 | 0.08 | 0.015 | 0.25 | 0.13 |
| Ti—8Mn (a) | 860 | 760 | | | | | | | 8 | | | 0.05 | 0.08 | 0.015 | 0.5 | 0.2 |
| Ti—7Al—4Mo (a) | 1030 | 970 | 7 | | | 4 | | | | | | 0.05 | 0.1 | 0.013 | 0.3 | 0.2 |
| Ti—6Al—2Sn—4Zr—6Mo (b) AMS 4981 | 1170 | 1100 | 6 | 2 | 4 | 6 | | | | | | 0.04 | 0.04 | 0.0125 | 0.15 | 0.15 |
| Ti—5Al—2Sn—2Zr—4Mo—4Cr (b)(c) | 1125 | 1055 | 5 | 2 | 2 | 4 | | | | 4 | | 0.04 | 0.05 | 0.0125 | 0.3 | 0.13 |
| Ti—6Al—2Sn—2Zr—2Mo—2Cr (c) | 1030 | 970 | 5.7 | 2 | 2 | 2 | | | | 2 | 0.25 | 0.03 | 0.05 | 0.0125 | 0.25 | 0.14 |
| Ti—3Al—2.5V (d) | 620 | 520 | 3 | | | | 2.5 | | | | | 0.015 | 0.05 | 0.015 | 0.3 | 0.12 |
| Ti—4Al—4Mo—2Sn—0.5Si | 1100 | 960 | 4 | 2 | | 4 | | | | | 0.5 | (e) | 0.02 | 0.0125 | 0.2 | (e) |

(a) Mechanical properties given for the annealed condition; may be solution treated and aged to increase strength;
(b) Mechanical properties given for the solution-treated-and-aged condition; alloy not normally applied in annealed condition;
(c) Semi-commercial alloy; mechanical properties and composition limits subject to negotiation with suppliers;
(d) Primarily a tubing alloy; may be cold drawn to increase strength;
(e) Combined $O_2 + 2N_2 = 0.27\%$;
(f) Also solution treated and aged using an alternative aging temperature (480° C., or 900° F.);
(g) other elements total (wt. %, max) 0.40;
(h) other elements each (wt. %, max) 0.10;
(i) Y (wt. %, max) 0.005;
(j) Y (wt. %, max) 0.05;
(k) Ru (wt. %, min) 0.08, Ru (wt. %, max) 0.14

Ti-6Al-4V (martensitic α+β Ti alloy; $K_\beta$=0.3) accounts for about half of all the Ti alloys produced and is popular because of its strength (1100 MPa), creep resistance at 300° C., fatigue resistance, good castability, plastic workability, heat treatability and weldability. Depending on required mechanical properties, heat treatments applied to Ti-6Al-4V alloys and more generally to α+β Ti alloys include: partial annealing (600-650° C. for about 1 hour), full annealing (700-850° C. followed by furnace cooling to about 600° C. followed by air cooling) or solutioning (880-950° C. followed by water quenching) and ageing (400-600° C.).

α+β Ti alloys constitute a very important group of structural materials used in aerospace applications. The microstructures of these α+β Ti alloys can be varied significantly during thermomechanical processing and/or heat treatment, allowing for tailoring of their mechanical properties, including fatigue behaviour, to specific application requirements.

The main types of microstructure of α+β Ti alloys are:
1. lamellar, formed after slow cooling when deformation or heat treatment takes place at a temperature in the single-phase β field above the beta transus temperature $\beta_{transus}$, comprising colonies of HCP α phase lamellae within large BCC β phase grains of several hundred microns in diameter; and
2. equiaxed, formed after deformation in the two-phase α+β field (i.e. below the beta transus temperature $\beta_{transus}$), comprising globular α-phase dispersed in a β phase matrix.

In one example, the Mth temperature of the set of temperatures is below a beta transus temperature $\beta_{transus}$ of the α+β Ti alloy.

The beta transus temperature $\beta_{transus}$ is the temperature at which the α+β→β transformation takes place and is thus the lowest temperature at which the Ti alloy is composed of a volume fraction $V_f$=1 of the BCC β phase.

The lamellar microstructure is characterized by relatively low tensile ductility, moderate fatigue properties, and good creep and crack growth resistance. Important parameters of the lamellar microstructure with respect to mechanical properties include the $\beta$ grain size D, size d of the colonies of $\alpha$ phase lamellae, thickness t of the $\alpha$ phase lamellae and the morphology of the interlamellar interface ($\beta$ phase). Generally, an increase in cooling rate leads to refinement of the microstructure—both $\alpha$ phase colony size d and $\alpha$ phase lamellae thickness t are reduced. Additionally, new $\alpha$ phase colonies tend to nucleate not only on $\beta$ phase boundaries but also on boundaries of other $\alpha$ phase colonies, growing perpendicularly to the existing $\alpha$ phase lamellae. This leads to formation of a characteristic microstructure called "basket weave" or Widmanstätten microstructure.

The equiaxed microstructure has a better balance of strength and ductility at room temperature and fatigue properties which depend noticeably on the crystallographic texture of the HCP $\alpha$ phase.

An advantageous balance of properties can be obtained by development of bimodal microstructure consisting of primary a grains and fine lamellar $\alpha$ colonies within relatively small $\beta$ grains (10-20 $\mu$m in diameter).

The phase composition of $\alpha+\beta$ Ti alloys after cooling from the $\beta$ phase is controlled, at least in part, by the cooling rate. The kinetics of phase transformations is related, at least in part, to the $\beta$ phase stability coefficient $K_\beta$ due to the chemical composition of the $\alpha+\beta$ Ti alloy. The range of the $\alpha+\beta \rightarrow \beta$ phase transformation temperature determines, at least in part, conditions of thermomechanical processing intended for development of a desired microstructure. Start and finish temperatures of $\alpha+\beta \rightarrow \beta$ phase transformation vary depending, at least in part, on the amounts of $\beta$ stabilizing elements (Table 2).

large amounts of energy and retard crack propagation. In this case, the $\alpha$ phase colonies behave as singular element of the microstructure. This phenomenon is more pronounced in $\alpha+\beta$ Ti alloys having smaller $\beta$ phase stability coefficients $K_\beta$, such as Ti-6Al-4V. A sufficient thickness of the $\beta$ phase enables absorption of energy in the process of plastic deformation of regions ahead of crack tips, contributing to slowing a rate of crack propagation and therefore increasing fatigue life.

In one example, the feed material comprises and/or is a Ti alloy selected from: Osprey Ti-6Al-4V Grade 5 (RTM) and/or Osprey Ti-6Al-4V Grade 23 (RTM), available from Sandvik AB (Sweden); CPTi-Gr.1, Gr.2, Ti64-Gr. 5, Gr. 23, Ti6242, Ti5553 and/or Beta 21S, available from GKN Sinter Metals Engineering GmbH (Germany). In one example, the feed material comprises and/or is a Ni alloy selected from: Osprey Alloy 625 (RTM) and/or Osprey Alloy 718 (RTM), available from Sandvik AB (Sweden); IN625, IN718, and/or Ni—Ti, available from GKN Sinter Metals Engineering GmbH (Germany). In one example, the feed material comprises and/or is an Al alloy selected from: AlSi7Mg, AlSi10Mg, and/or Al4047, available from GKN Sinter Metals Engineering GmbH (Germany). In one example, the feed material comprises and/or is an Al alloy selected from: 304L, 316L, 420, and/or 17-4PH, available from GKN Sinter Metals Engineering GmbH (Germany). In one example, the feed material comprises and/or is an Fe alloy selected from: 4340, 4630, 5120, 8620, 20MnCr5, 42CrMo4, 1.2709, H13, Fe—Si and/or Fe—Ni, available from GKN Sinter Metals Engineering GmbH (Germany).

In one example, the method comprises introducing the feed material into the chamber after gettering at least some of the first gas from the evacuated chamber using the getter. That is, additive manufacturing is commenced only after the gettering.

TABLE 2

Start and finish temperature of the $\alpha + \beta \rightarrow \beta$ phase transformation for selected $\alpha + \beta$ Ti alloys ($v_h = v_c = 0.08°$ C. $s^{-1}$); ns: nucleation start; ps: precipitation start; s: start; f: finish.

| Temperature (° C.) | Ti—6Al—4V | Ti—6Al—2Mo—2Cr | Ti—6Al—5Mo—5V—1Cr—1Fe |
|---|---|---|---|
| $T_{\alpha+\beta\rightarrow\beta}^{ns}$ | 890 | 840 | 790 |
| $T_{\alpha+\beta\rightarrow\beta}^{ps}$ | 930 | 920 | 830 |
| $T_{\alpha+\beta\rightarrow\beta}^{f}$ | 985 | 980 | 880 |
| $T_{\beta\rightarrow\alpha+\beta}^{s}$ | 950 | 940 | 850 |
| $T_{\beta\rightarrow\alpha+\beta}^{s}$ | 870 | 850 | 810 |

The microstructure of $\alpha+\beta$ Ti alloys after deformation or heat treatment carried out above the beta transus temperature $\beta_{transus}$ depends, at least in part, on the cooling rate. Relatively higher cooling rates ($>18°$ C. $s^{-1}$) result in martensitic $\alpha'(\alpha'')$ microstructure for alloys having $\beta$ phase stability coefficient $K_\beta < 1$ and metastable $\beta_M$ microstructure for alloys having higher $\beta$ phase stability coefficient $K_\beta$. Low and moderate cooling rates lead to development of lamellar microstructures consisting of colonies of $\alpha$ phase lamellae within large $\beta$ 3 phase grains. A decrease in cooling rate cause an increase in both the thickness t of individual $\alpha$ phase lamellae and size d of the $\alpha$ colonies. These in turn lower the yield stress and tensile strength of these $\alpha+\beta$ Ti alloys.

The lamellar $\alpha$ phase microstructure of $\alpha+\beta$ Ti alloys heat treated in the $\beta$ phase has a beneficial effect on fatigue behaviour, due to frequent changes in crack direction and secondary crack branching. When $\alpha$ phase lamellae are too large, thin layers of $\beta$ phase are not capable of absorbing In one example, the method comprises heating, at least in part, the feed material using a fusion source, for example a laser beam and/or an electron beam. In other words, the additive manufacturing comprises and/or is L-PBF, for example SLM or LMD, and/or comprises and/or is EBM. In this way, the feed material may be fused, thereby providing the article by additive manufacturing.

In one example, heating, at least in part, the gettering and heating, at least in part, the feed material comprise using the same fusion source, for example a laser beam and/or an electron beam. In other words, the same laser beam and/or electron beam is used for both gettering the first gas and subsequently, during additive manufacturing, fusion of the feed material. In this way, no additional hardware is required for the gettering.

Chamber

The chamber (also known as a build chamber) is for additive manufacturing of the article therein. Systems for additive manufacturing, including suitable build chambers, are known.

Gas

The method comprises evacuating at least some of the first gas from the chamber, comprising reducing the pressure therein from the first pressure to the second pressure of the set of pressures, wherein the first gas has the first concentration and the second concentration of the set of concentrations at the first pressure and the second pressure respectively.

That is, the chamber is evacuated such that a pressure therein is reduced. In one example, the first pressure is ambient pressure (i.e. atmospheric pressure, 1 bar). In one example, the second pressure is in a range from 0.01 mbar to 100 mbar, preferably in a range from 0.1 mbar to 50 mbar, more preferably in a range from 1 mbar to 25 mbar. This should be understood that by reducing the pressure in the chamber, while an amount of the first gas in the chamber is lowered, a concentration thereof with respect to other gases therein may not necessarily be lowered, for example depending on a pumping speed with respect to the first gas, which may vary as a function of pressure. For example, pumping speeds of vacuum pumps are typically specified for $N_2$. In one example, the first gas is oxygen, having the first concentration of about 21 vol. % at the first pressure of 1 bar. In one example, the first gas is nitrogen, having the first concentration of about 78 vol. % at the first pressure of 1 bar.

In one example, the first gas is one of oxygen, nitrogen, water vapour and carbon dioxide, for example originating from ambient air and/or a process gas. In one example, the set of gases includes oxygen, nitrogen, water vapour and/or carbon dioxide, for example originating from ambient air and/or a process gas.

Gettering

The method comprises gettering at least some of the first gas from the evacuated chamber using the getter, thereby lowering a concentration of the first gas from the second concentration to a third concentration of the set of concentrations.

Generally, a getter is a relatively reactive material which may be included in a vacuum chamber, for achieving and/or maintaining a desired vacuum. Upon striking the getter, gas molecules chemically combine with the getter and/or are absorbed, chemisorbed and/or adsorbed by the getter. The getter thus removes relatively small amounts of gas from the evacuated chamber.

Typically, getters are activated after evacuation of the chamber by heating. For example, a flashed getter is introduced into the chamber in a reservoir during assembly or maintenance and then heated and evaporated after evacuation of the chamber. The vaporised getter, usually a volatile metal, reacts with residual gases in the chamber and condenses on the relatively cool walls of the chamber, for example. This condensate continues to absorb gas. A non-evaporable getter (NEG), in contrast with the flashed getter, remains in solid form. For example, a coating NEG may be applied to metal parts in the chamber that are heated during use. For example, a non-volatile metal powder may be sintered in a porous coating to the surface of electrodes and heated to a temperature in a range from 200° C. to 1200° C. For example a bulk NEG, such as a sheet, a strip, a wire or a sintered pellet of a gettering metal or alloy, may be mounted on a hot component or heated by a heating element. A getter pump or sorption pump includes a bulk NEG, independently heated, and usually disposed in a separate chamber, fluidly coupled via a valve with the chamber. An ion getter pump, typically used in ultrahigh vacuum (UHD) systems, uses a high-voltage electrode to ionise gas molecules, which are accelerated towards the getter surface.

In one example, gettering at least some of the first gas from the evacuated chamber comprises heating, at least in part, the getter.

In one example, heating, at least in part, the getter comprises heating, at least in part, the getter using a fusion source, for example a laser beam and/or an electron beam. In one example, heating, at least in part, the gettering and heating, at least in part, the feed material comprise using the same fusion source, for example a laser beam and/or an electron beam. In other words, the same laser beam and/or electron beam is used for both gettering the first gas and subsequently, during additive manufacturing, fusion of the feed material. In this way, no additional hardware is required for the gettering.

In one example, heating, at least in part, the getter comprises melting, ablating and/or subliming at least in part, the getter. In this way, the first gas maybe gettered, at least in part.

In one example, the method comprises providing the getter in the chamber, for example within such as fully within the chamber. Additionally and/or alternatively, the method comprises providing the getter in fluid communication with the chamber.

In one example, the getter comprises and/or is an alkali metal for example Na, K, Rb or Cs, an alkaline earth metal for example Mg, Ca, Sr or Ba, a first row transition metal for example Sc, Ti, Cr, Mn, Ni or Cu, a second row transition metal for example Zr or Nb, a third row transition metal for example Hf or Ta, a lanthanide for example La or Ce, an actinide for example U, Cs, P, Ce, La, a group III element for example Al, a group V element for example P, and/or a mixture thereof, for example an alloy or a compound, for example Al-10 wt. % Si or a Zr alloy, as described below.

Non-evaporable getters include metals that form a passivation layer at room temperature, which is not present when heated, thereby absorbing, chemisorbing and/or adsorbing gas molecules. Porous alloys or powder mixtures of Al, Zr, Ti, V and Fe and alloys thereof may be used. Known alloys may have names of the form St (Stabil) followed by a number, for example:

St 707 is 70 wt. % zirconium, 24.6 wt. % vanadium and the balance iron;

St 787 is 80.8 wt. % zirconium, 14.2 wt. % Co and balance mischmetal; and

St 101 is 84 wt. % zirconium and 16 wt. % Al.

In one example, the getter comprises and/or is a substrate, for example a base plate, for additive manufacturing the article thereon. Typically, a material of the substrate is selected according to the article to be built thereon, for example for chemical compatibility therewith. The substrate may be incorporated into the article or maybe mechanically removed therefrom after additive manufacturing. Advantageously, the inventors have identified that the substrate for additive manufacturing may be used as a getter, for example when heated and optionally melted. In this way, the gettering may be performed using the substrate already present in the chamber, for example by heating using the same fusion source, such as a laser beam and/or an electron beam, used for the additive manufacturing, prior to and/or during the additive manufacturing. That is, the gettering may be included as an additional step in the additive manufacturing, using existing components. In one example, gettering at least some of the first gas from the evacuated chamber using the getter comprises rastering the substrate using a fusion source provided for the additive manufacturing.

In one example, the substrate comprises and/or is a Ti alloy, a Ni alloy, an Al alloy, a Co alloy or a stainless steel.

In one example, gettering at least some of the first gas from the evacuated chamber using the getter comprises reducing the pressure therein from the second pressure to a third pressure of the set of pressures, wherein the first gas has the third concentration at the third pressure. That is, the gettering results in both a lowering of the concentration of the first gas and reduction of the pressure in the chamber. It should be understood that gettering by melting and/or vaporising the getter may transiently increase a pressure in the chamber, which is subsequently reduced upon solidification and/or condensation.

In one example, the method comprises measuring the third concentration, for example using a detector such as a residual gas analyser (RGA), and optionally, wherein gettering at least some of the first gas from the evacuated chamber is responsive to a result of the measuring. In this way, gettering may be performed until a desired level of the first gas in the chamber is reached. In one example, the additive manufacturing comprises measuring a concentration of the first gas and gettering at least some of the first gas in response to a result of the measuring, optionally controlling, for example pausing, the additive manufacturing until a desired level of the first gas in the chamber is reached.

In one example, the third concentration is in a range from 0 ppm to 50 ppm, preferably in a range from 1 ppb to 20 ppm, more preferably in a range from 10 ppb to 10 ppm, most preferably in a range from 25 ppb to 1 ppm. In one example, the first gas is oxygen and the third concentration is in a range from 0 ppm to 50 ppm, preferably in a range from 1 ppb to 20 ppm, more preferably in a range from 10 ppb to 10 ppm, most preferably in a range from 25 ppb to 1 ppm. In this way, oxidation of the feed material may be reduced to tolerable levels, thereby lessening deleterious effects thereto, including to the article and/or to the unused feed material.

In one example, gettering at least some of the first gas from the evacuated chamber using the getter comprises gettering at least some of the set of gases, wherein the set of gases comprises the first gas and a second gas, wherein the first gas and the second gas are selected from oxygen, nitrogen, water vapour and/or carbon dioxide, for example originating from ambient air and/or a process gas.

Additive Manufacturing

The method comprises additive manufacturing the article from the feed material in the gettered chamber.

In one example, additive manufacturing the article comprises gettering at least some of the first gas from the gettered chamber using the getter. That is, gettering may continue, for example simultaneously, intermittently or periodically, during the additive manufacturing, for example to maintain the third concentration of the first gas in the chamber and/or to limit a concentration of the first gas in the chamber to at most a predetermined threshold. For example, a process gas may flow through the chamber during additive manufacturing, thereby providing a protective atmosphere while flushing emissions therefrom. However, the process gas may include the first gas as an impurity. Additionally and/or alternatively, the first gas may leak into the chamber and/or outgas within the chamber. Hence, by gettering during the additive manufacturing, a concentration of the first gas in the chamber may be controlled, for example to at most a predetermined threshold.

In one example, the additive manufacturing comprises providing a protective atmosphere, for example by flowing a process gas, such as Ar, He or $N_2$, through the chamber, as described below.

Article

In one example, the article comprises and/or is an aerospace component, such as an airframe component, a vehicle component, such as an engine component, or a medical component, such as an implantable medical device.

Protective Atmosphere

In one example, the method comprises providing a protective atmosphere, for example using an inert gas such as Ar, He or $N_2$, in the evacuated chamber, before additive manufacturing the article from the feed material, preferably before gettering at least some of the first gas from the evacuated chamber using the getter. In this way, the additive manufacturing may be performed in a protective atmosphere, for example at a relatively low pressure such as in a range from 0.01 mbar to 100 mbar, preferably in a range from 0.1 mbar to 50 mbar, more preferably in a range from 1 mbar to 25 mbar. In one example, providing the protective atmosphere comprises backfilling and/or purging the evacuated chamber.

Backfilling

In one example, the method comprises backfilling the evacuated chamber, for example using an inert gas such as Ar, He or $N_2$, before gettering at least some of the first gas from the evacuated chamber using the getter.

Purging

In one example, the method comprises purging the evacuated chamber, for example using an inert gas such as Ar, He or $N_2$, before gettering at least some of the first gas from the evacuated chamber using the getter.

PREFERRED EXAMPLE

In one preferred example, the method is of additive manufacturing, by laser powder bed fusion, of an article from a feed material, comprising a Ti alloy powder, in a chamber, the method comprising:

evacuating at least some of a first gas of a set of gases from the chamber, comprising reducing a pressure therein from a first pressure to a second pressure of a set of pressures, wherein the first gas has a first concentration and a second concentration of a set of concentrations at the first pressure and the second pressure respectively, wherein the second pressure is in a range from 0.01 mbar to 100 mbar, preferably in a range from 0.1 mbar to 50 mbar, more preferably in a range from 1 mbar to 25 mbar;

providing a protective atmosphere, using Ar, in the evacuated chamber, comprises purging the evacuated chamber with Ar;

gettering at least some of the first gas from the evacuated chamber using a getter, thereby lowering a concentration of the first gas from the second concentration to a third concentration of the set of concentrations, wherein the getter comprises and/or is a substrate, comprising a Ti alloy, for additive manufacturing the article thereon and wherein gettering comprises rastering the substrate using a laser beam provided for the additive manufacturing, wherein the first gas is oxygen and wherein the third concentration is in a range from 0 ppm to 50 ppm, preferably in a range from 1 ppb to 20 ppm, more preferably in a range from 10 ppb to 10 ppm, most preferably in a range from 25 ppb to 1 ppm; and additive manufacturing the article from the feed material in the gettered chamber on the rastered substrate.

Apparatus

The present invention provides an apparatus for additive manufacturing, for example by and/or comprising powder bed fusion, of an article from a feed material, for example comprising a powder and/or a filament, comprising:

a chamber for additive manufacturing the article therein;

a pump for evacuating at least some of a first gas of a set of gases from the chamber, comprising reducing a pressure therein from a first pressure to a second pressure of a set of pressures, wherein the first gas has a first concentration and a second concentration of a set of concentrations at the first pressure and the second pressure respectively;

a getter for gettering at least some of the first gas from the chamber, thereby lowering a concentration of the first gas from the second concentration to a third concentration of the set of concentrations, optionally wherein the getter comprises and/or is a substrate, for example a base plate, for additive manufacturing the article thereon; and optionally, a fusion source, for example a laser beam and/or an electron beam, for heating, at least in part, the getter and/or the feed material.

The additive manufacturing, the powder bed fusion, the article, the feed material, the powder, the filament, the chamber, the evacuating, the first gas, the first pressure, the second pressure, the set of pressures, the first concentration, the second concentration, this set of concentrations, the getter, the gettering, the third concentration, the substrate, the baseplate, the fusion source, the laser beam and/or the electron beam may be as described with respect to the first and/or second aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
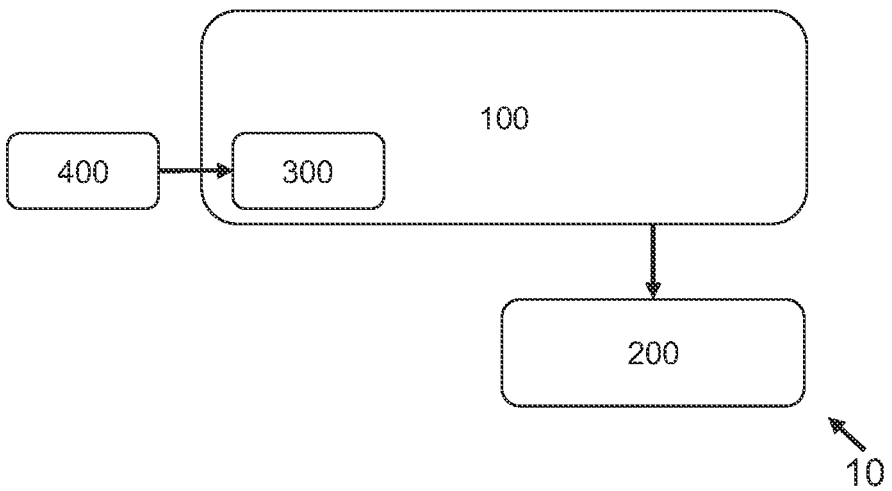
FIG. 1 schematically depicts an apparatus according to an exemplary embodiment.

FIG. 1 schematically depicts an apparatus 10 according to an exemplary embodiment.

The apparatus 10 is for additive manufacturing, for example by and/or comprising powder bed fusion, of an article from a feed material, for example comprising a powder and/or a filament, comprising:

a chamber 100 for additive manufacturing the article therein;

a pump 200 for evacuating at least some of a first gas of a set of gases from the chamber 100, comprising reducing a pressure therein from a first pressure to a second pressure of a set of pressures, wherein the first gas has a first concentration and a second concentration of a set of concentrations at the first pressure and the second pressure respectively;

a getter 300 for gettering at least some of the first gas from the evacuated chamber 100, thereby lowering a concentration of the first gas from the second concentration to a third concentration of the set of concentrations, optionally wherein the getter comprises and/or is a substrate, for example a base plate, for additive manufacturing the article thereon; and optionally a fusion source 400, for example a laser beam and/or an electron beam, for heating, at least in part, the getter and/or the feed material.

Figure 2:
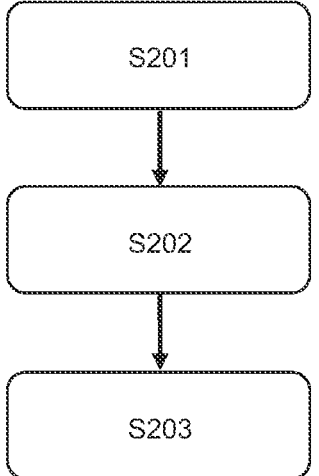
FIG. 2 schematically depicts a method according to an exemplary embodiment.

FIG. 2 schematically depicts a method according to an exemplary embodiment.

The method is of additive manufacturing, for example by and/or comprising powder bed fusion, of an article from a feed material, for example comprising a powder and/or a filament, in a chamber.

At S201, the method comprises evacuating at least some of a first gas of a set of gases from the chamber, comprising reducing a pressure therein from a first pressure to a second pressure of a set of pressures, wherein the first gas has a first concentration and a second concentration of a set of concentrations at the first pressure and the second pressure respectively.

At S202, the method comprises gettering at least some of the first gas from the evacuated chamber using a getter, thereby lowering a concentration of the first gas from the second concentration to a third concentration of the set of concentrations.

At S203, the method comprises additive manufacturing the article from the feed material in the gettered chamber.

The method may comprise any of the steps described herein, for example with respect to the first aspect.

Figure 3:
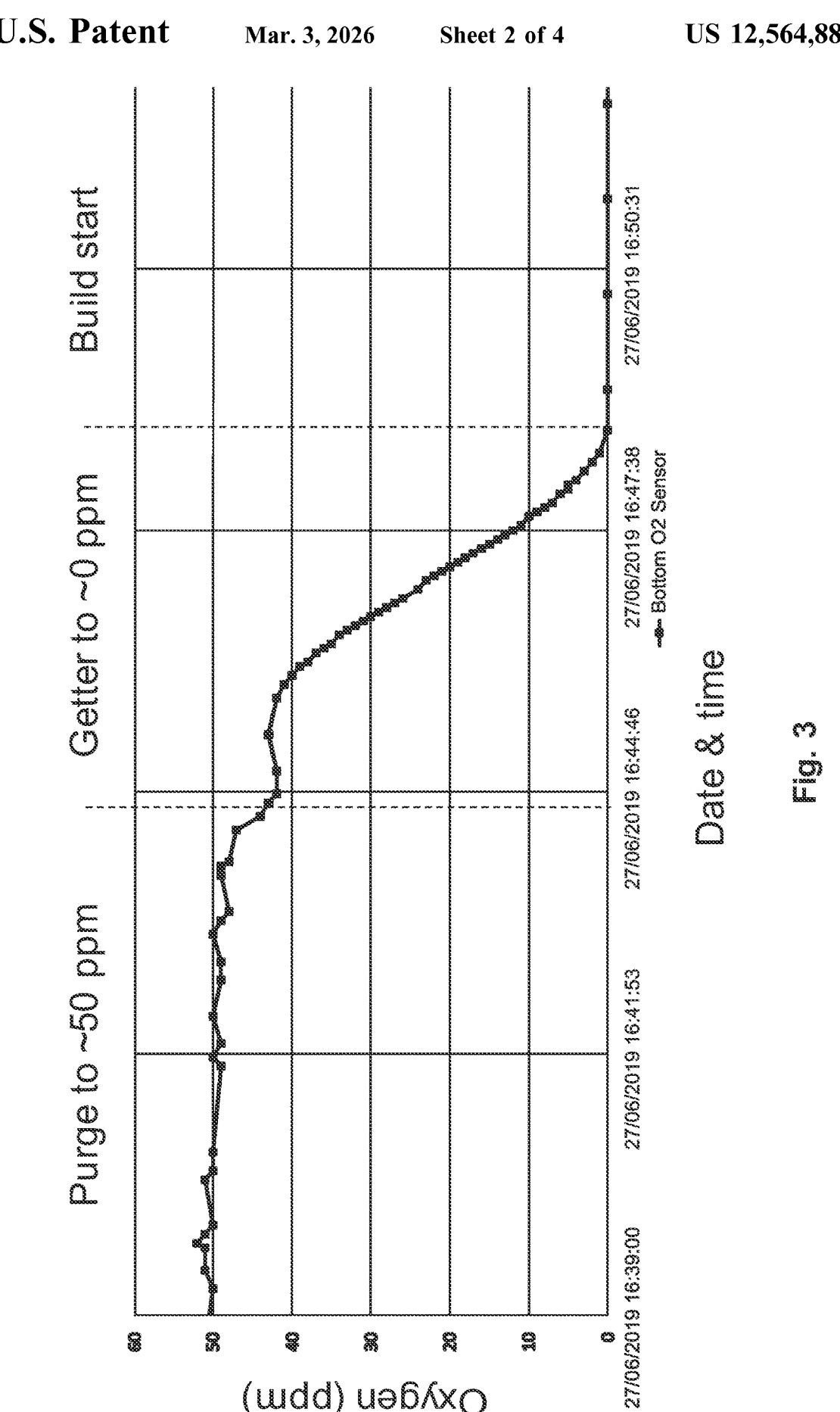
FIG. 3 schematically depicts a method according to an exemplary embodiment.

FIG. 3 schematically depicts a method according to an exemplary embodiment.

In this example, the method uses a Ti baseplate, on which L-PBF takes place, as a getter for residual traces of oxygen and optionally nitrogen present in a process gas, normally Ar, prior to commencement of additive manufacturing. In this context, a getter may be defined as a reactive material which preferentially reacts with traces of reactive gases, such as oxygen, in an otherwise evacuated or chemically inert system (i.e. the chamber for additive manufacturing).

In this example, the process gas is Ar and is used to provide a suitably inert atmosphere for the additive manufacturing and a means of transporting away (i.e. flushing), from the article during additive manufacturing, emissions created by the laser fusion technique. Such emissions may comprise particles and/or condensing vaporised metal known as condensate). For L-PBF using Ti alloy powders, the purity of the process gas is critically important to the ability to reuse or recycle unused powder. Hence, it is desirable to reduce the levels of oxygen and optionally nitrogen to as low as practically possible, for example at most or below 10 ppm and preferably at most or below 1 ppm.

In this example, a Renishaw RenAM 500Q (RTM) additive manufacturing system, having four build lasers, is adapted to implement the method. The RenAM 500Q has a build volume of (X) 250 mm×(Y) 250 mm×(Z) 350 mm, giving a typical maximum build envelope of (X) 245 mm× (Y) 245 mm×(Z) 335 mm, when using a standard substrate having a thickness of 15 mm. Ar consumption, as the process gas, during additive manufacturing is up to 50 L/hour. Recommended Ar purity is 99.998% or better i.e. at most 20 ppm impurities. At such impurity levels, significant contamination of the articles and/or unused powder will occur, particularly for Ti alloy powders.

According to the manufacturers, the time to prepare the build chamber atmosphere to 1,000 ppm oxygen is 15 minutes. At such a relatively high level of oxygen, successful additive manufacturing using Ti alloy powders may not be possible. A working pressure in the build chamber is 10 mbar. By evacuating the build chamber and backfilling with Ar, a substantial amount of the remaining oxygen may be removed, for example to as low as 500 ppm. By repeatedly evacuating and backfilling with Ar, substantially lower levels of remaining oxygen may be achieved, for example as low as 50 ppm. Ar consumption during backfilling is up to 1,200 L at a rate of 400 L/min. Furthermore, as typical for conventional additive manufacturing build chambers, the build chamber is not hermetically sealed and oxygen levels rise monotonically from the initial lower level during additive manufacturing.

To further reduce the initial oxygen level, the chamber may be evacuated, for example to the working pressure of 10 mbar, and subsequently purged with Ar for about 1 hour (about 60 minutes), by continuously flowing Ar through the chamber at a rate of about 400 L/min, thereby displacing the majority of residual air and hence oxygen and nitrogen in the chamber. In this way, remaining oxygen levels in the chamber may be reduced to a range of from 8 ppm to 20 ppm. However, even these relatively low levels of oxygen are undesirable for both additive manufacturing and for reuse or recycling of unused powders while Ar consumption is elevated and the extended purge time reduces a duty cycle of the additive manufacturing. Hence, it is desirable to further reduce levels of residual gases such as oxygen and optionally nitrogen from the atmosphere in the chamber In contrast to these conventional methods of lowering oxygen levels in the build chamber, in this example, the highly reactive nature of Ti is exploited, so as to getter residual gases such as oxygen and optionally nitrogen from the atmosphere in the chamber. Particularly, the lasers used for the L-PBF are instead used to heat and locally melt surface regions of a Ti alloy baseplate (substrate), upon which the article is built during additive manufacturing, prior to admitting powder into the chamber. In this way, the molten Ti of the baseplate getters the residual gases. Particularly, by rastering the four build lasers of the RenAM 500Q on the Ti alloy baseplate, the level of oxygen in the build chamber may be reduced to less than 1 ppm in a few minutes.

FIG. 3 is a graph of oxygen concentration (ppm) in the build chamber as a function of time for this method according to an exemplary embodiment.

The build chamber was evacuated to about 10 mbar and then purged with Ar, reducing the detected residual oxygen concentration in the build chamber to about 50 ppm. The Ti alloy baseplate was rastered over an area of about (X) 220 mm×(Y) 220 mm over 2 scan layers during a time of approximately 180 s, according to the parameters of Table 3, thereby lowering the residual oxygen concentration in the build chamber to less than 1 ppm, which is the detection limit of the oxygen detector provided for the build chamber. Typically, the level of nitrogen is inferred from the detected oxygen concentration and is estimated to be in the same proportion as present in ambient air (i.e. approximately 4:1).

TABLE 3

RenAM 500Q parameters for gettering.

| Parameter | Value |
| --- | --- |
| Hatching | ON |
| Hatch Distance (mm) | 0.13 |
| Rotation increment angle (degrees) | 0 |
| Reference Point Relocation | ON |
| Jump Optimisation | ON |
| Hatch Offset (mm) | 0.01 |
| Rotation start angle (degrees) | 0 |
| Filter length (mm) | 0.01 |
| Repetition Limit | 20 |
| Hatch Compensation | OFF |
| Hatch Compensation Threshold (%) | 30 |
| Power (W) | 145 |
| Point Distance (mm) | 0.1 |
| Focus (mm) | 0 |
| Exposure Time (ms) | 50 |

That is, the gettering is effective in lowering the residual oxygen concentration in the build chamber from a relatively high concentration of about 50 ppm to less than 1 ppm. At this relatively low level of oxygen, which is significantly lower than may be achieved even by extended purging, oxide and/or nitride formation and/or interstitial oxygen and/or nitrogen incorporation during the L-PBF additive manufacturing are substantially avoided, thereby attenuating deleterious effects thereof to the article. Furthermore, unused powder may be reused or recycled for similar reasons.

Figure 4:
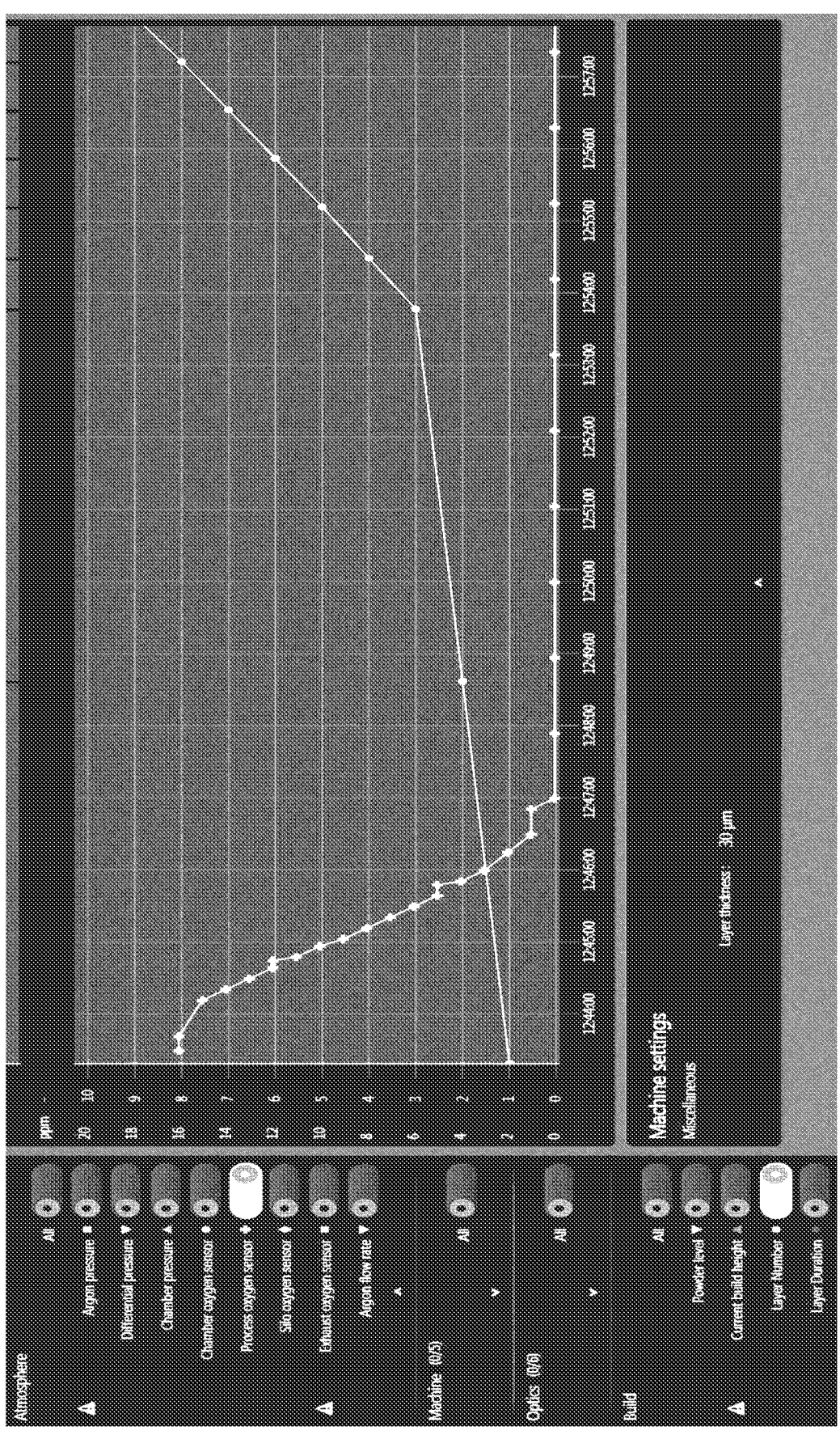
FIG. 4 schematically depicts a method according to an exemplary embodiment.

FIG. 4 schematically depicts a method according to an exemplary embodiment. In this example, the method is generally as described with respect to FIG. 3. Particularly, FIG. 4 is a graph of oxygen concentration (ppm) in the build chamber as a function of time for this method according to an exemplary embodiment.

The build chamber was evacuated to about 10 mbar and then purged with Ar for about 60 minutes, by continuously flowing Ar through the chamber at a rate of about 400 L/min, thereby displacing the majority of residual air and hence oxygen and nitrogen in the chamber and reducing the detected residual oxygen concentration in the build chamber to about 16 ppm. The Ti alloy baseplate was rastered over an area of about (X) 220 mm×(Y) 220 mm over the first of two scan layers during a time of 220 s, according to the parameters of Table 3, thereby lowering the residual oxygen concentration in the build chamber to less than 1 ppm over the first scan layer, which is the detection limit of the oxygen detector provided for the build chamber. The feed material was then admitted into the build chamber and L-PBF additive manufacturing commenced.

Figure 5:
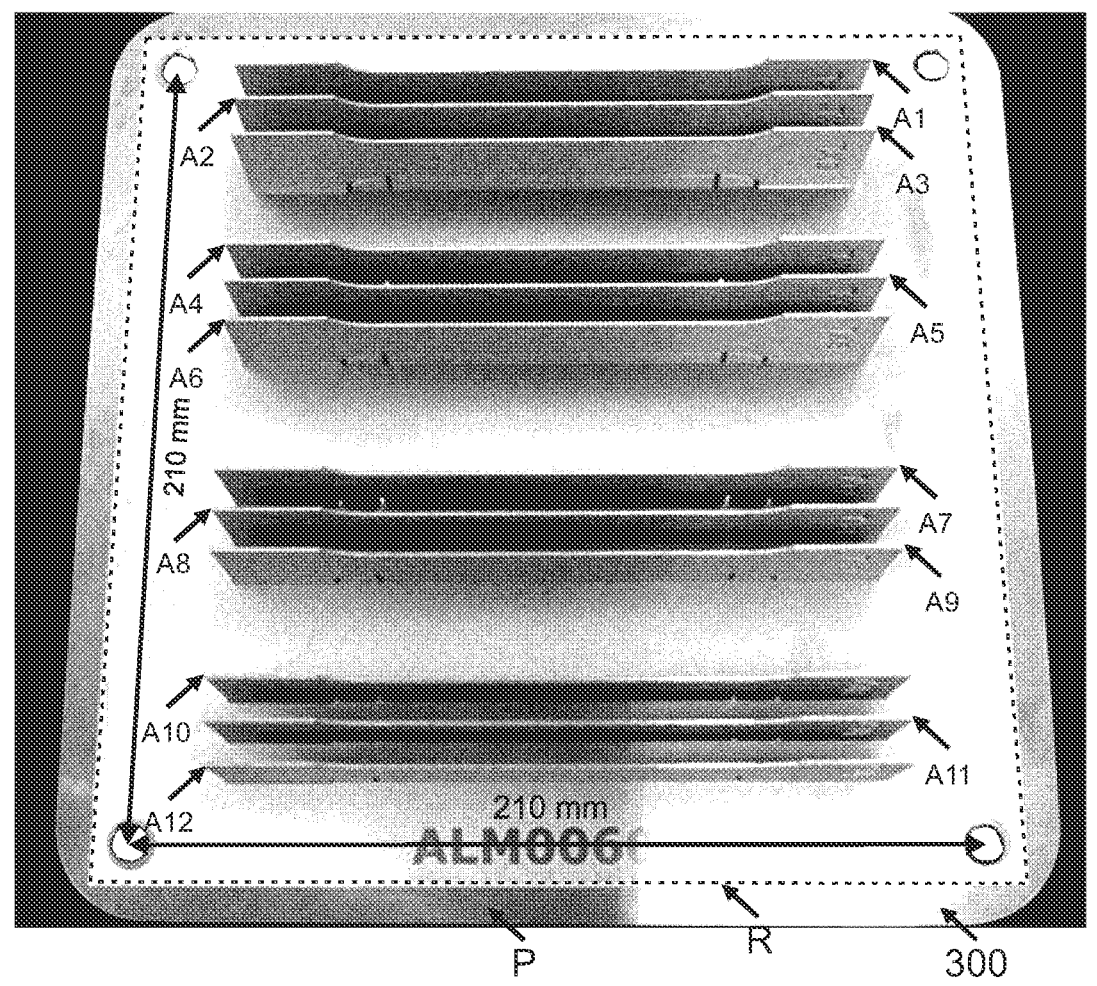
FIG. 5 schematically depicts an article manufactured according to an exemplary embodiment.

FIG. 5 schematically depicts an article manufactured according to an exemplary embodiment. Particularly, FIG. 5 is a photograph of 12 articles A1-A12, particularly tensile test specimens, manufactured by L-PBF additive manufacturing from Ti alloy powder, on a square Ti alloy baseplate 300, according to an exemplary embodiment.

Gettering, by rastering the baseplate 300, is evident from the matt surface of the rastered region R, delimited by white dashed lines for convenience. In contrast, the periphery P of the baseplate 300, which was not rastered, has the original polished surface.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

20

What is claimed is:

1. A method of additive manufacturing of an article from a feed material in a chamber, the method comprising:
   A) evacuating at least some of a first gas from the chamber, said evacuating comprising reducing a pressure therein from a first pressure to a second pressure, wherein the first gas has a first concentration at the first pressure and a second concentration at the second pressure;
   B) gettering at least some of the first gas from the evacuated chamber using a getter located in the evacuated chamber, thereby lowering the concentration of the first gas from the second concentration to a third concentration; and
   C) additive manufacturing the article from the feed material in the gettered chamber;
   wherein:
      step B) comprises heating the getter using, at least in part, a fusion source;
      step C comprises heating the feed material using, at least in part, the fusion source; and
      in step C) the article is additive manufactured using the getter as a substrate comprising a baseplate.

2. The method according to claim 1, wherein in step B) heating the getter comprises melting, ablating and/or subliming, at least in part, the getter.

3. The method according to claim 1, wherein the getter is a Ti alloy, a Ni alloy, an Al alloy, a Co alloy or a stainless steel.

4. The method according to claim 1, wherein step B) comprises reducing the pressure in the chamber from the second pressure to a third pressure, wherein the first gas has the third concentration at the third pressure.

5. The method according to claim 1, wherein the first gas is oxygen and the third concentration is in a range from 0 ppm to 50 ppm.

6. The method according to claim 1, further comprising, between step A) and step B), backfilling or purging the evacuated chamber.

7. The method according to claim 1, further comprising measuring the third concentration.

8. The method according to claim 1, further comprising introducing the feed material into the chamber between step B) and step C).

9. The method according to claim 1, wherein the feed material comprises a first row transition metal, a second row transition metal, a group III element, and/or a mixture thereof.

* * * * *